April 11, 1950
W. BERNARD ET AL
2,503,466
APPARATUS FOR MANUFACTURING CEMENT-ASBESTOS BOARD
Filed Oct. 21, 1947
2 Sheets-Sheet 2
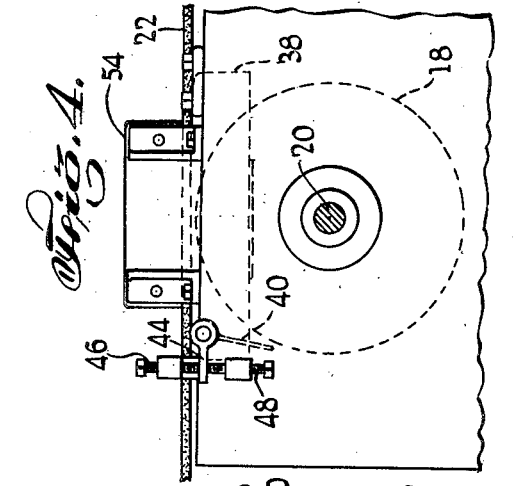
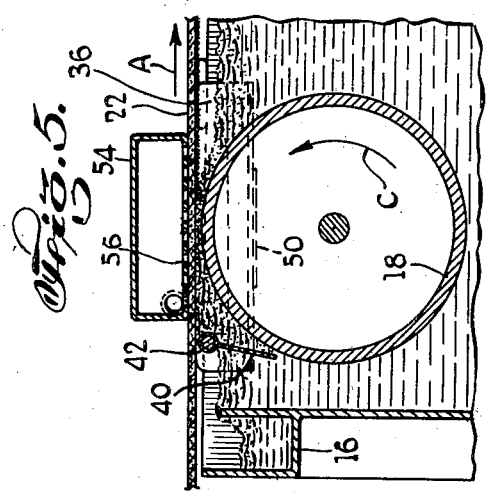
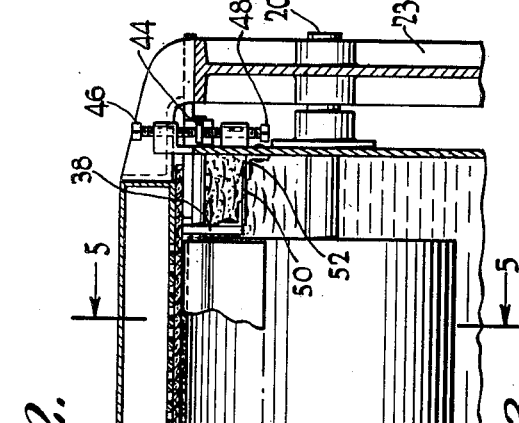
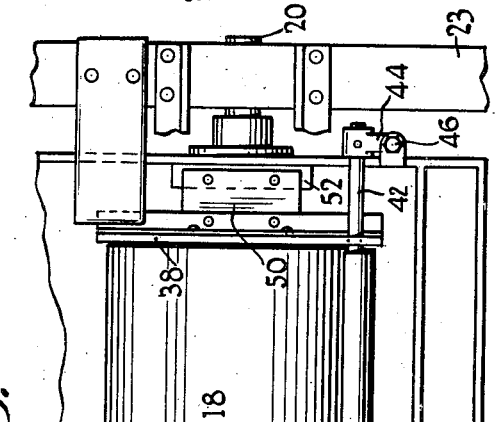
INVENTORS
WILLIAM BERNARD
JOSEPH BERNARD
BY
ATTORNEY Patented Apr. 11, 1950

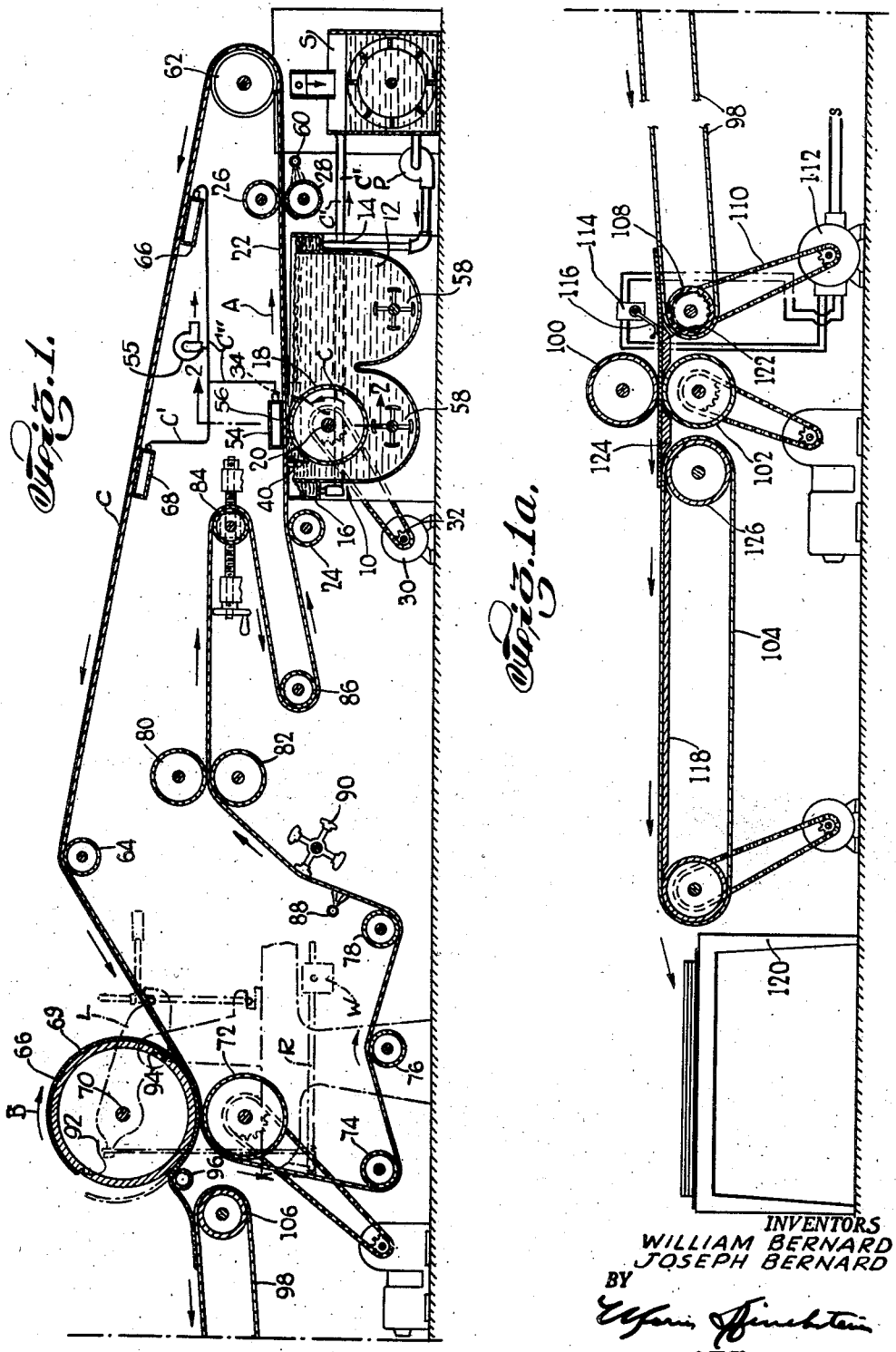

2,503,466

UNITED STATES PATENT OFFICE 2,503,466

APPARATUS FOR MANUFACTURING CEMENT-ASBESTOS BOARD

William Bernard and Joseph Bernard, West Millington, N. J., assignors to American Asbestos Industries, Inc., Berkeley Heights, N. J., a corporation of New Jersey Application October 21, 1947, Serial No. 781,204

7 Claims. (Cl. 92—43)

This invention relates to an apparatus for manufacturing cement-asbestos board such as is used, for example, in the fabrication of cement-asbestos shingles.

The instant invention is an improvement over the apparatus and process shown, described and claimed in our co-pending application for "Cement asbestos board," Serial No. 674,808, filed June 6, 1946.

It is an object of the present invention to provide an improved apparatus which, with the same number of molding vats and the same width of carrier band, can make cement-asbestos board considerably faster than the machine shown in our said co-pending application.

It is another object of our invention to provide an apparatus of the character described in which single and laminated layers of cement-asbestos are so treated that within a minute after a layer has been picked up from the molding vat it forms part of a laminated board dry enough to be handled, and which accomplish this desirable result without artificially drying the board, as in an oven, to strengthen the same before storage thereof.

It is a further object of the invention to provide an apparatus of the character described which avoid all necessity for using artificial heat in preparing cement-asbestos board for commercial sale.

It is an additional object of the invention to provide an apparatus of the character described wherein an improved system is used to separate slabs from the continuous cement-asbestos layer on the carrier band.

Other objects of the invention will in part be obvious and in part hereinafter be pointed out.

The invention accordingly consists in the features of construction, combinations of elements and arrangement of parts which will be exemplified in the apparatus hereinafter described and of which the scope of application will be indicated in the appended claims.

In the accompanying drawings, in which is shown one of the various possible embodiments of our invention, Fig. 1 is a longitudinal sectional view through the molding and laminating section of a cement-asbestos board plant constructed in accordance with our present invention, the background structure being omitted for clarity;

Fig. 1a is a similar view through the calendering section of said plant;

Fig. 2 is an enlarged vertical central sectional view through the upper portion of the molding vat, the same being taken substantially along the line 2—2 of Fig. 1;

Fig. 3 is a fragmentary, partially broken away plan view of the molding vat; and Fig. 4 is a side view of the molding vat; and Fig. 5 is a sectional view through the molding vat, the same being taken substantially along the line 5—5 of Fig. 2.

Referring now in detail to the drawings, 10 denotes a molding vat which contains a thin cement-asbestos mixture 12 known in the trade as a "slurry." This slurry is delivered at a uniform regulatable rate to a storage tank S. From the storage tank the slurry is delivered by a pump P to an inlet trough 14, extending along one end of the molding vat. The overflow from the molding vat runs into a discharge trough 16 which is connected by a conduit C' to the storage tank in a manner more fully described. If desired, the slurry can be fed by gravity from the storage tank to the molding vat and the overflow pumped back to the storage tank.

The vat contains an imperforate, cylindrical collector roll 18 which rotates in the direction indicated by the arrow C with a horizontal shaft 20 disposed perpendicularly to the longitudinal axis of an endless, pervious, fibrous carrier band 22 arranged to travel over the top of the vat 10. Said band is guided in its movement across the vat by an idly turning entry guide roll 24 and a pair of cooperating exit guide rolls 26 and 28, hereinafter described in detail. These guide rolls define a path of travel for the band above the level of the top of the molding vat, starting from a horizontal line slightly above the top of the discharge trough 16 and slowly uniformly rising to a slightly greater height over the inlet trough 14.

The collector roll is so located with respect to the top of the vat and to the height of the slurry therein that the upper portion of the roll is above normal level of the slurry in the vat and, furthermore, is slightly higher than the top of the vat. The two ends of the collector roll, as will be seen from Fig. 2, are spaced inwardly from the side walls of the vat, the reason for this being pointed out shortly hereinafter. Said collector roll is shorter than the width of the carrier band 22 and is centrally located with respect thereto. The upper portion of the collector roll is spaced beneath the undersurface of the carrier band. This spacing is quite small but, nevertheless, must be provided and, in a satisfactorily operating form of a machine embodying our invention, is about 1/64 of an inch.

The shaft 20 extends through the side walls of the vat and is journaled in a frame 23. One end of the shaft is rotated in a proper sense by any suitable mechanism, as for instance a motor 30, chain 32 and sprockets 34. As the collector roll rotates, it will lift above the normal level of the slurry in the vat a layer of slurry which moves with its turning surface. Pursuant to the present invention, such action of the roll is employed to raise above the normal level of the slurry in the vat a localized quantity of slurry in the form of a squat wide column terminating at the undersurface of the carrier band, this raising being performed in such fashion that the elevated column of slurry is forced against the undersurface of the band over a limited zone, hereinafter referred to as the "pressure zone."

The upper portion of the collector roll operates in what, to all intents and purposes, is a shallow box disposed immediately beneath the undersurface of the carrier band. The side walls of the box comprise a pair of parallel strips 36, 38 which are vertically disposed and extend in a direction parallel to the longitudinal axis of the belt. These strips are located immediately adjacent two ends of the collector roll (see Figs. 2 and 3) to substantially prevent from pouring over the ends of the roll and into the vat, slurry which has been raised up above the normal level of slurry in the vat by rotation of the collector roll. An end wall of the box is defined by a vane or baffle 40. Said vane is secured along its upper edge to a shaft 42 extending through somewhat elongated openings in the strips 36, 38 and journaled in the side walls of the vat. One end of the shaft carries an arm 44 (Fig. 4) whose position is controlled by two set screws 46, 48. The upper edge of the vane 40 is disposed quite close to the undersurface of the carrier band and is above the normal level of slurry in the vat. The lower edge of the vane, whose position can be adjusted by manipulating the set screws 46, 48, is disposed near the turning surface of the collector roll. This vane acts to dam against movement into the vat slurry which has been raised above the normal level of slurry in the vat by turning of the collector roll. It will be appreciated that the space between the lower edge of the vane and the collector roll will determine the rate at which slurry drains back into the vat and, therefore, will regulate the pressure of the raised slurry column against the undersurface of the carrier band.

The strips 36, 38 are supported by flat pieces of spring metal 50 which are carried on angle irons 52 bolted to the side walls of the vat. These springs are so positioned and shaped that the top edges of the strips are pressed slightly against the undersurface of the carrier band and serve to sharply define the front and back edges of the "pressure zone." The leading edge of the pressure zone is roughly marked by the top edge of the vane 40—actually the zone terminates short of said vane. The trailing edge of the pressure zone is approximately marked by the top of the collector roll—actually the zone extends somewhat past this point (see Fig. 5). The slurry, as it is brought up by rotation of the collector roll, will accumulate in the area bounded by the top of the collector roll, the vanes 40 and the strips 36, 38. For a distance from the top of the collector roll toward the vane 40 the slurry actually is forced under pressure against the undersurface of the carrier band. As the level of the raised slurry approaches the vane 40, it descends slightly to the top of the vane. However, such descent does not extend far back to the collector roll due to the somewhat viscous nature of the slurry and the rapid rate at which slurry is raised into the pressure zone. Thus, over the zone defined by the aforesaid elements, the slurry will be forced up against the undersurface of the carrier band under pressure.

It may be mentioned that the collector roll and its adjuncts, are particularly well suited to uniformly distribute the slurry under approximately uniform pressure over an appreciable area of the undersurface of the carrier band so that a uniform layer of slurry will be applied to the band. In addition, the particular apparatus serves to exactly demark the longitudinal edges of the layer deposited on the carrier band. Furthermore, said collector roll will not throw against the undersurface of the carrier band heavy or sharp extraneous objects which may be present in the slurry and which would lessen the already short life of the carrier band. This latter effect is enhanced by having the outer surface of the collector roll smooth, or even plated.

In order that slurry pressed against the undersurface of the carrier band may be facilitated in its adherence thereto as a layer, and for other reasons which later will be apparent, there is, in accordance with the present invention, provided above the upper surface of the carrier band, immediately over the pressure zone, a vacuum means such as a suction box 54. Said box is connected by a suitable conduit C" to the intake of a suction pump 55. The suction box may, as shown, be in the shape of hollow, elongated trough whose bottom is closed by a perforate plate 56. Said suction box will suck through the pervious carrier band water in the layer of slurry deposited on the undersurface of said band at the pressure zone. However, the carrier band will prevent any cement or asbestos fibers from passing through so that substantially all of the active materials of the slurry are retained in the layer of cement-asbestos deposited on the undersurface of the band. The water discharged by the suction pump runs to a storage tank. Said suction box may extend a short distance in the direction of travel of the band (indicated by the arrow A in the various figures) beyond the pressure zone, so as to aid in adhering to the band the layer of slurry applied at the pressure zone and also to assist in making certain that this freshly deposited layer is not too greatly laden down with water.

The slurry in the tank is kept in a constant source of agitation and, therefore, of uniform consistency, by a pair of rotating paddle wheels 58.

The carrier band, after leaving the collector roll 18, enters between the rolls 26, 28, which are idler pressure rolls and are employed to express a substantial amount of water both from the carrier band and the freshly deposited layer of cement-asbestos. The upper of the two rolls may be formed from a resilient material, as for instance rubber. The lower of the rolls is sometimes known as a dandy roll made of foraminous material, e. g., screening, whereby to expedite the squeezing of water out of the cement-asbestos layer. The water thus expressed is allowed to fall onto the floor, which is sloped toward the storage tank in which water is accumulated and stored in order to recover the cement and asbestos fiber sediment which settles out. The recovered water is subsequently reused.

It is noted in passing that the amount of cement and asbestos fiber which passes to the storage tank is very small in comparison to the amount which reached said tanks in previously employed machines wherein the collector roll was foraminous rather than imperforate.

The surface of the foraminous roll 28 is kept clean by constantly spraying water thereon from nozzles 60. Suitable means, e. g., a spring system or hydraulic pressure, is employed to force the rolls together under a proper degree of pressure.

The carrier band runs from the rolls 26, 28 to a reversing idler roll 62 and thence to another idler 64. In the reach between the two idlers 62, 64, where the cement-asbestos layer is on the upper surface of the carrier band, a pair of suction boxes or other equivalent suction means 68 is disposed against the undersurface of the carrier band. These boxes pull additional water or watery fluid from the cement-asbestos layer, which fluid gravitated to the bottom of the layer when the carrier band was reversed or which drained out of the layer after the layer had a short time to set. Said suction boxes also function to suck water or watery fluid out of the carrier band into which such fluid flows when the carrier band is reversed.

From the idler roll 64 the band rides on to an accumulator roll 66 to which the cement-asbestos layer from the band is transferred in the form of an elongated, laminated tubular slab 69.

Said accumulator roll is carried by a shaft 70 and rests on a motor-driven bottom press roll 72 whereby to aid in transferring the cement-asbestos layer from the carrier band to the accumulator roll. The pressure between the accumulator and press rolls is adjustable and may be controlled by journaling the accumulator roll shaft at its opposite ends on pivotally mounted levers L connected to rods R having movable counterweights W shiftable therealong to vary the degree of force with which the accumulator roll bears down against the press roll.

After leaving the press roll the carrier band travels about idler rolls 74, 76, 78, idler squeeze rolls 80, 82, an idler take-up roll 84 whose position is variable to adjust the degree of tension in the carrier band, and a reversing idler roll 86.

In the reach between the idler roll 78 and the squeeze rolls 80, 82, the band passes a water spray 88 and a motor-driven whipper 90. From the reversing idler roll 86 the band passes back to the guide roll 24.

In the operation of the machine thus far described, the carrier band can be driven at any suitable linear speed. We have found that a suitable speed is one such as is conventionally employed in the cement-asbestos board industry, being selected to obtain a maximum length of life of the short-lived carrier band. A typical speed is 100 feet per minute. The collector roll is turned at a suitably high speed to pump enough slurry into the pressure zone to maintain a suitable pressure therein. The degree of pressure is controlled in accordance with the speed of the carrier band and the thickness of cement-asbestos layer required to be laid on the undersurface of said band. A typical speed for the collector roll which secures eminently satisfactory results is 235 R. P. M. with a collector roll 12½ inches in diameter spaced $\frac{1}{16}$ of an inch from the carrier band. The layer of cement-asbestos applied to the carrier band by a collector roll of such speed, size and location and with the band traveling at the aforementioned rate is such that five layers of cement-asbestos suffice to make a commercially suitable cement-asbestos board.

It has been found that the rate at which our machine can manufacture board when operating in the foregoing manner is at least three times as fast as that of a conventional machine having the same band width and not employing either the method shown herein or that shown in our copending application. Principally, this higher rate of production is due to the fact that the individual layers of the laminated cement-asbestos board are thicker than heretofore.

With a collector roll of the size, speed and location mentioned and with the carrier band traveling at the rate set forth, the vane 40 will function properly when its lower edge is set approximately $\frac{1}{16}$ inch away from the collector roll.

During the operation of the machine, slurry is, of course, constantly fed to the inlet trough and withdrawn from the discharge trough and in the pressure zone slurry is maintained about one and one-half inches above the normal level of the slurry in the vat by the pumping operation of the collector roll 18.

Inasmuch as the strips 36, 38 define the sides of the pressure zone, there is no need to scrape off the band any cement-asbestos outside of the area where it is desired to have the same deposited.

In conventional cement-asbestos board manufacturing machines, when the laminated tube 69 is stripped from the accumulator roll, it still is so wet that it cannot be handled manually or calendered without tearing the same apart and, therefore, the slabs of cement-asbestos delivered from the accumulator roll heretofore have been passed to a baking oven where the board was dried out, at least partially, so that it could be manipulated safely.

In contrast to this, a slab of cement-asbestos board taken off our accumulator roll, because of the treatment given it in the portions of the machine already described, already has had so much water removed from it that said slab can be handled without fear of tearing, its tensile strength being appreciable. This comparative dryness of the slab results from various factors and is believed to be due mainly to the presence of the vacuum means at the point of application of the slurry to the band, i. e., over the carrier band at a point above the collector roll, and to the use of the dandy roll 28 which squeezes out a substantial amount of water from the cement-asbestos layer before the carrier band is reversed and brought over the suction boxes 66, 68.

When the cement-asbestos layer formed on the carrier band is transferred to the accumulator roll, several convolutions of the layer are wrapped about the roll. These convolutions are allowed to build up until the laminated tube has reached a sufficient thickness. By way of example, a typical tube consists of five layers of laminations, i. e., the cement-asbestos layer transferred from the carrier band to the accumulator roll is allowed to be wrapped five times about the roll before it is stripped therefrom.

As soon as the desired number of laminations have been superposed upon the accumulator roll and one another, the tube is stripped from said roll. The actual stripping process can be achieved in a manner well known in the field. This consists, for example, in providing the accumulator roll with two slots 92, 94 which run across the face of the roll parallel to the shaft 70 and are diametrically opposed. When in the case mentioned, i. e., with five laminations, the roll has completed 4½ turns from the time the last tube was stripped therefrom, the operator of the machine runs the tip of an instrument, such as a rod, along the slot which is covered by four laminations. Then when the next slot is covered with five laminations, he runs the same instrument along said next slot. Immediately thereafter he inserts the tip of the instrument under the surface of the tube at the trailing edge of the groove in the sense of rotation of the accumulator roll indicated by the arrow B. This causes the slab of laminated cement-asbestos board to start to fall off the tube. It falls to the left, as viewed in Fig. 1, over an idling guide roll 96, which is mounted to turn about a shaft running parallel to the accumulator roll 70 and is located just below said roll at the lower left-hand quadrant thereof so that the guide roll will receive the leading edge of the slab as it drops off of the accumulator roll. The slab is led by the guide roll to an endless conveyor belt 98 driven in such direction that the upper reach thereof moves away from the accumulator roll. At the time of delivery of the slab onto the belt 98, said belt is driven at a speed slightly in excess of the linear speed of travel of the periphery of the accumulator roll.

As the accumulator roll continues to turn, the slab will be led onto the belt 98 until the slot which first had the instrument slid therethrough reaches the guide roll 96. At this time the instrument is again traversed through said slot to sever this slab from the remainder of the laminated tube still on the accumulator roll. Then the operator inserts the instrument beneath the trailing edge of the last-mentioned slot to strip the leading edge of the next slab from said roll. This slab too thereupon commences to fall over the guide roll 96 and is fed onto the belt 98. As the machine continues to operate, the next slot will be reached, which marks the end of the last slab to be stripped. When such slot passes a point just above the guide roll 96, the second slab being delivered to the belt 98 will be ripped from the layer of cement-asbestos being wrapped around the accumulator roll because of the higher speed of travel of the belt 98. This action prevents the stripping from the accumulator roll of the single layer of cement-asbestos which is being transferred to said roll from the carrier band and therefore allows the next laminated tube to start building up. It therefore will be appreciated that the over-speed of travel of the belt 98 in comparison to the linear speed of travel of the periphery of the accumulator roll is a feature of the invention.

The length of the upper reach of the belt 98 is in excess of the peripheral distance around the accumulator roll so that said reach can accommodate the length of the slab or slabs delivered during one revolution from the accumulator roll. Said belt leads the slabs to a pair of calendering rolls 100, 102. These rolls are pressed together by any suitable means well known to the art, as for example spring means or hydraulic means (not shown). Optionally, the lower roll 102 is journaled in stationary bearings and the upper roll 100 in movable bearings to which a suitable downward pressure is imparted. Preferably, the lower roll 102 is smooth and, if desired, the upper roll 100 likewise may be smooth, in which case the calendering rolls simply serve to compress, and thereby compact, the cement-asbestos slab and thus impart to it an additional degree of strength which enables it to be better handled without tearing. It should be noted, however, that despite the fact that a substantial degree of pressure is exerted by the calendering rolls—in practice it may be 1½ tons or more over a length of approximately 2 feet—no, or very little, water is left to be squeezed out of the cement-asbestos slab at this point.

Instead of using smooth rolls, the upper roll 100 can be embossed or engraved so as to impart some desirable design to one surface of the slab. One such design consists of a wood grain and another simply of a series of parallel scorings in the slab, which, of course, are not made sufficiently deep to detrimentally affect the strength of the slab either when damp or after the slab has been allowed to set.

The calendering rolls are motor-driven, preferably at a speed considerably below that at which the slabs are delivered from the accumulator roll in order to prevent tearing or cracking of the slab. These different rates of speed may be employed since the accumulator roll only delivers slabs once every five revolutions thereof.

To enable the machine to operate in this fashion, the belt 98 which leads slabs from the accumulator roll to the calendering rolls is so driven that it can be operated at two speeds, one speed—the high speed—being slightly in excess of the linear speed of the accumulator roll and the other speed—the low speed—being matched to linear speed of the calender rolls. To this end, the belt 98 runs over two rollers 106, 108, the latter being driven by suitable means, such as a chain 110, from a two-speed motor 112 or any other two-speed suitable source of power. These speeds are so selected with respect to the reduction effected by the chain drive that, at the higher speed of the motor 112, the requisite high speed of the belt 98 will prevail and at the low speed of the motor 112, the proper low speed drive of the belt will be obtained.

The two-speed motor is of any conventional type and may be of the kind in which the selection of speeds is controlled by the use of relays. The motor is regulated by a two-pole, double-throw snap-action momentary electric switch 114 of the kind, for example, known as a "micro switch" in the electrical field. This switch has a sensing means in the form of an actuating finger 116 which is biased toward the belt 98 and whose tip is adapted to press against the upper reach of the belt 98 above the roller 108 at the delivery end of said belt.

When the switch touches the surface of the belt, i. e., when no slab is presented at this point, the switch 114 controls the motor 112 in a manner well known in the art so that this motor runs at high speed. At such time, therefore, the belt 98 moves rapidly and is ready to receive a slab from the accumulator roll. When the leading edge of the slab moves beneath the tip of the finger 116, it will raise said finger to its second position, in which the switch causes the motor 112 to operate at its low speed. Thus, as the slab is delivered to the calendering rolls by the belt 98, the speed of the slabs suddenly will be checked to match the linear speed of the calendering rolls. The speed of the calender rolls is sufficiently fast to enable both slabs to be calendered before the following pair of slabs is delivered to the belt 98 from the calendering roll, so that after said slabs have been calendered and before the next set of slabs starts to fall onto the belt 98, said belt will have speeded up to receive said next slabs.

The calendering rolls deliver the slabs to an endless conveyor belt 118 which transfers them to a point adjacent a suitable support, such as a table 120. The finished slabs are lifted off the belt 118 and laid on the table. Desirably, a short supporting platform 122 may be interposed between the delivery roll 108 of the belt 98 and the entry point of the calendering rolls and another supporting platform 124 interposed between the discharge point of the calendering rolls and the pick-up roll 126 of the belt 118.

After the slabs have been transferred to the table they are stored under cover at ambient temperature until they have dried and set sufficiently to be cut to shape. This may involve from one to three days, depending upon weather conditions.

It will thus be seen that we have provided an apparatus which achieves the several objects of our invention and is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative, and not in a limiting sense.

Having thus described our invention, we claim as new and desire to secure by Letters Patent:

1. In an apparatus for manufacturing cement-asbestos board, the combination of, a molding vat adapted to contain cement-asbestos slurry, means to feed slurry to said vat, means to deliver from said vat slurry above a pre-determined normal level a pervious fibrous carrier band, means to move said carrier band past and over said vat, an imperforate roll mounted to rotate about a horizontal axis in said vat with the upper portion thereof above the normal level of slurry in the vat and below the undersurface of the carrier band, means to rotate said roll, a member extending transversely of the roll and damming at a level above the normal level of the slurry in the vat over a pre-determined zone spaced from the sides of the vat a localized quantity of slurry raised from the slurry in the vat by rotation of the roll, and pressed thereby against the undersurface of the carrier band over said pre-determined zone and means including a suction device above the band to create a vacuum at the upper surface of said carrier band above said roll.

2. In an apparatus for manufacturing cement-asbestos board, the combination of, a molding vat adapted to contain cement-asbestos slurry, means to feed slurry to said vat, means to deliver from said vat slurry above a pre-determined normal level a pervious fibrous carrier band, means to move said carrier band past and over said vat, an imperforate roll mounted to rotate about a horizontal axis in said vat with the upper portion thereof above the normal level of slurry in the vat and below the undersurface of the carrier band, means to rotate said roll, members disposed alongside the ends of the roll, a member lying across the roll and extending above the normal level of slurry in the vat, said last-named member being spaced from the top of the roll in the direction of rotation of the roll whereby to dam above the normal level of the slurry in the vat a quantity of slurry raised by rotation of the roll, and means including a suction device above the band to create a vacuum at the upper surface of said carrier band above said roll.

3. An apparatus as set forth in claim 2 wherein the member lying across the roll can be moved toward and away from the surface of the roll so as to regulate the damming effect on the slurry raised by rotation of the roll.

4. In an apparatus for manufacturing cement-asbestos board, the combination of, a molding vat adapted to contain cement-asbestos slurry, means to feed slurry to said vat, means to deliver from said vat slurry above a pre-determined normal level a pervious fibrous carrier band, means to move said carrier band past and over said vat, an imperforate roll mounted to rotate about a horizontal axis in said vat with the upper portion thereof above the normal level of slurry in the vat and below the undersurface of the carrier band, means to rotate said roll, a pair of members mounted alongside the ends of said roll and extending parallel to the direction of the movement of the band, the upper edges of said members contacting the undersurface of the carrier band, another member extending across said roll, said member being spaced away from the top of said roll in the direction of rotation of said roll, the upper edge of said member being adjacent the undersurface of the carrier band and the lower edge of said member being adjacent the roll whereby a localized quantity of slurry raised from the slurry in the vat by the rotation of the roll is dammed at a level above the normal level of the slurry in the vat and is pressed against the undersurface of the carrier band over a pre-determined zone spaced from the sides of the vat, and means including a suction device above the band to create a vacuum at the upper surface of said carrier band above said roll.

5. An apparatus as set forth in claim 4 wherein means is provided to resiliently urge the pair of members against the undersurface of the carrier band.

6. An apparatus as set forth in claim 4 wherein means is provided to adjust the spacing between the lower edge of the last-named member and the roll.

7. In an apparatus for manufacturing cement-asbestos board, the combination of, a molding vat adapted to contain cement-asbestos slurry, means to maintain cement-asbestos slurry in said vat at a predetermined normal level, a pervious fibrous carrier band, means to move said carrier band past and over said vat, an imperforate roll mounted to rotate about a horizontal axis in said vat with the upper portion thereof above the normal level of slurry in the vat and below the undersurface of the carrier band, means to rotate said roll, and a member extending transversely of the roll and damming at a level above the normal level of the slurry in the vat over a predetermined zone spaced from the sides of the vat a localized quantity of slurry raised from the slurry in the vat by rotation of the roll, and pressed thereby against the undersurface of the carrier band over said predetermined zone.

WILLIAM BERNARD.
JOSEPH BERNARD.

(References on following page)

REFERENCES CITED

The following references are of record in the file of this patent:

UNITED STATES PATENTS

| Number | Name | Date |
|---|---|---|
| 440,750 | Shinn | Nov. 18, 1890 |
| 1,708,724 | Haug | Apr. 9, 1929 |
| 1,859,986 | Saunders | May 24, 1932 |
| 1,879,797 | Ellis | Sept. 27, 1932 |
| 2,046,271 | Lane et al. | June 30, 1936 |
| 2,052,746 | Bing | Sept. 1, 1936 |
| 2,171,155 | Wright | Aug. 29, 1939 |
| 2,184,619 | Leonard | Dec. 26, 1939 |
| 2,355,006 | Millspaugh | Aug. 1, 1944 |
| 2,411,416 | Dieckbrader | Nov. 19, 1946 |

FOREIGN PATENTS

| Number | Country | Date |
|---|---|---|
| 677,683 | Germany | Dec. 1, 1939 |
| 685,368 | Germany | Dec. 16, 1939 |